May 17, 1966     G. KRAUS     3,251,554

ROCKET MOTOR NOZZLE

Filed Jan. 29, 1962     3 Sheets-Sheet 1

INVENTOR.
GEORGE KRAUS
BY
ATTORNEY

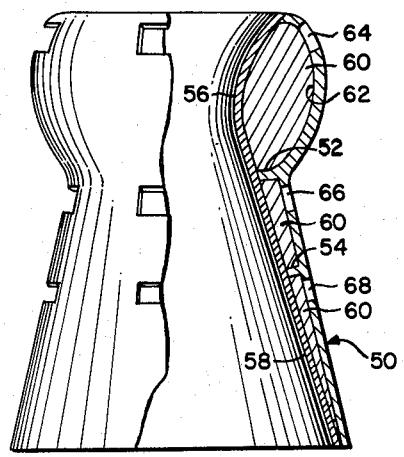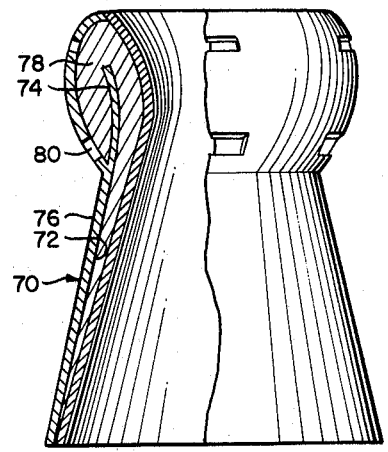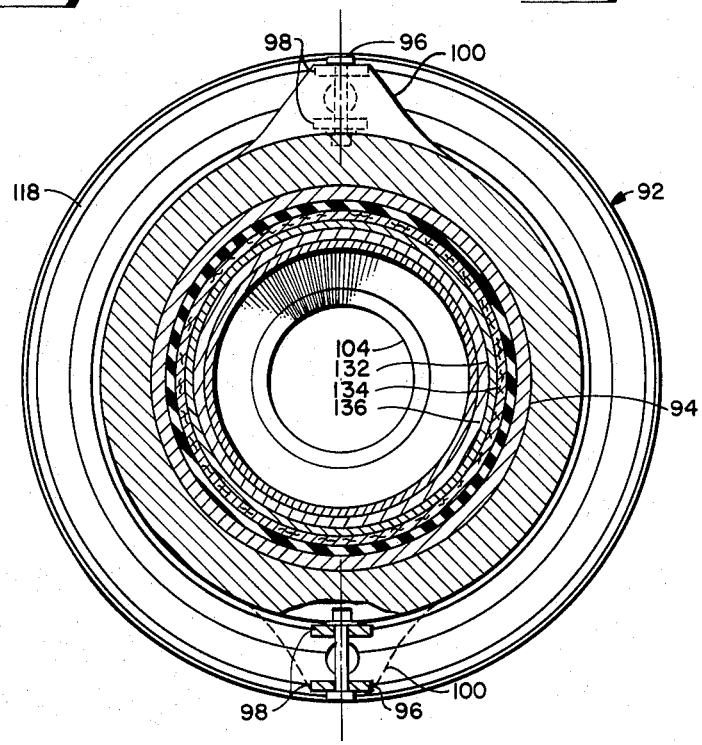

May 17, 1966 G. KRAUS 3,251,554
ROCKET MOTOR NOZZLE
Filed Jan. 29, 1962 3 Sheets-Sheet 3
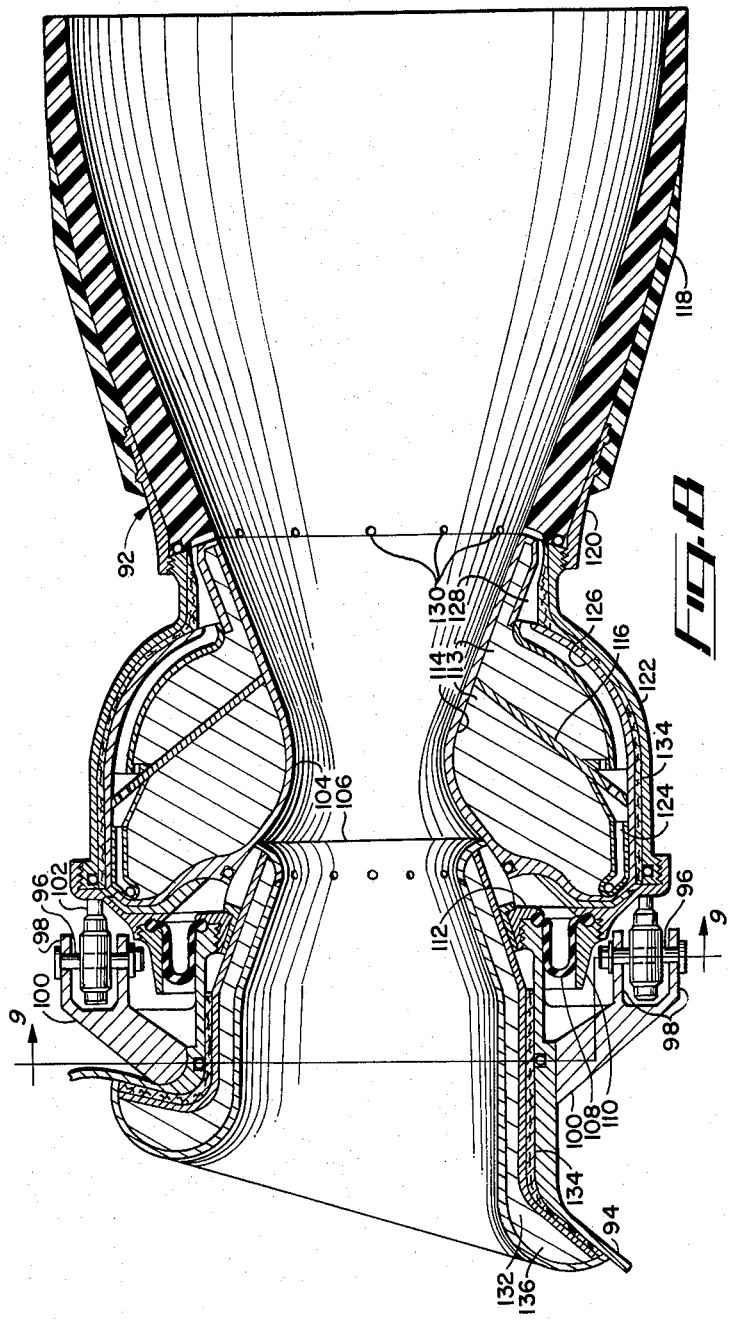
INVENTOR.
GEORGE KRAUS
BY
ATTORNEY United States Patent Office 3,251,554
Patented May 17, 1966

1

3,251,554
ROCKET MOTOR NOZZLE
George Kraus, Hillsdale, N.J., assignor to Aerojet-General Corporation, Azusa, Calif., a corporation of Ohio
Filed Jan. 29, 1962, Ser. No. 170,855
1 Claim. (Cl. 239—265.15)

This invention relates to apparatus for cooling bodies and more particularly to cooling rocket motor nozzles and has for its object to provide a rocket nozzle which can resist extremely high hot gas erosion.

For the purposes of this specification a "rocket motor" is hereby defined as a thrust producing system which derives its thrust from the ejection of hot gases generated from combustible materials carried in the system; and in particular this rocket motor is particularly directed to those which use propellants as the combustible material used to generate the hot gases. And "rocket motor nozzles" is the exhaust nozzle of the rocket motor usually specially shaped for producing a jet.

One of the principal technical problems in the development of solid rocket motors is the design and development of nozzles capable of operation at the flow of high pressure combustion products of propellants that exhibit flame temperatures in excess of 6000° F. All known refractory materials and known methods of cooling are inadequate, complicated, or weighty for the nozzle operations under such conditions coupled with long firing durations.

Solution of this problem has been made more difficult because of the exacting and critical operational requirements which are inherent in rocket motor operation. Prior attempts to solve the problems of rocket motor cooling proposed the use of liquid and gaseous film cooling, chemical reaction cooling, and transpiration cooling.

In liquid and gaseous film cooling, the coolant is injected through a narrow ring of porous material upstream of the nozzle throat. The nozzle wall downstream of the porous ring is protected effectively by the coolant. In the transpiration cooling method, a liquid or gas is forced through the entire surface of a porous nozzle wall. In the chemical reaction cooling method, a porous insert upstream of the nozzle throat is impregnated with a coolant such as lithium hydride, plastics, etc.

Such prior attempts were not entirely satisfactory in resisting the erosive action of the hot gases of the products of combustion. In many of the proposed cooling systems, porous inserts must be inserted in the nozzle throat which exposes the nozzle to erosive action and in effect limits the efficiency of the nozzle during operation. The greatest limiting factor in the known cooling methods is the resistance of the materials to withstand extremely high propellant gas temperatures for the longest firing duration.

As distinguished from these and other unsuccessful prior attempts, the present invention provides a simple apparatus for cooling objects, especially rocket nozzles with solid coolants. This invention then permits the manufacture of lightweight solid rocket nozzles which may sustain long firing durations never heretofore attained by known cooling methods.

Briefly, the present invention relates to a body having a cavity therein that is filled with a solid coolant material which may be boiled and vaporized through a

2 perforation in the body. Various chambers and baffling arrangements may be used to obtain selective thermal zones in cooling the body. The size and location of the perforations through a body such as a nozzle also can determine the boiling point of the coolant and thereby regulate the amount of heat which is withdrawn from the nozzle.

Four aspects of boiling phenomena are of great importance in the application of evaporation cooling for solid rocket nozzles. These are minimum boiling point, type of boiling, temperature drop from wall to coolant and peak heat flux.

In any discussion of boiling it is appropriate to know what determines the boiling point. The temperature near the surface of a boiling liquid is a function of the liquid pressure above it decreasing as the vapor pressure decreases. Below the surface of the boiling liquids at any level the temperature is higher than at the surface because of an increase in pressure resulting from the weight of liquid above the particular level. At low altitudes where the pressure caused by weight of the liquid is small compared with the pressure on the free surface of the boiling liquid, this effect is negligible. But at high altitudes the pressure due to the head may be many times the vapor pressure and the bulk temperature of the boiling liquid will be considerably higher than the temperature at the vapor liquid interface.

Another important factor which will further increase the minimum boiling point that may be attained in the pressure drop is due to vapor flow from the container to the surroundings.

Since the effects of head and pressure drop are additive, the minimum coolant boiling points that may be achieved in a nozzle correspond to pressures of 4 to 10 millimeters of mercury above the pressure outside the container. Head and pressure drop effects are of importance only at low pressures and ICBM operates at altitudes corresponding to pressures below 10 millimeters of mercury for the second stage and $10^{-3}$ millimeters of mercury for the third stage.

Several kinds of boiling have been known for years and discussed in several standard texts of which one is Heat Transmission by W. H. McAdams, New York, McGraw-Hill, 1941. One form of boiling in which the liquid is heated by natural convection and vaporization takes place only at the free surface. Nucleate boiling is a range of boiling in which bubbles form at nuclei at the heating surface and rise through the body of liquid. Transition boiling operates at high heat fluxes in which the number of active nuclei at the heating surface increases until the surface is insulated with a vapor film. Film boiling occurs when the heat is transferred through the vapor film by conduction and radiation.

The optimum type of boiling for this particular application is nucleate boiling. Operation in this zone permits high heat fluxes for relatively small temperature differences between the nozzle wall and the cooling liquid. The smaller this temperature difference, the smaller the nozzle wall temperature to the coolant boiling point and the cooler the wall.

The maximum flux for nucleate boiling is called peak heat flux. If this flux is exceeded a transition to film boiling takes place and the temperature difference between the boiling liquid and the nozzle wall increases exponentially. As the temperature difference becomes excessively high burnout will occur; the nozzle wall will melt or otherwise fail.

Immediately after ignition the heat flux in the nozzle wall is high and it decreases as the wall temperature rises. Heat is conducted through the wall to the coolant metal and in a very short time the coolant melts absorbing energy equivalent to the heat of fusion. As the liquid metal is heated further it absorbs an amount of energy equivalent to the sensible heat. When the boiling point is reached an amount of heat equivalent to the latent heat of vaporization is absorbed by the coolant.

Once boiling has begun the heat flux remains essentially constant. At low altitudes heat flux will rise very slowly because of the decrease in the coolant boiling point with increased altitude. At high altitudes or when maximum boiling point is reached there is no change in the heat flux.

Other objects of this invention will appear in the following description and appended claims, reference being had to the accompanying drawings forming a part of this specification wherein light reference characters designate correpsonding parts in the several views.

In the drawings:

FIG. 5 is a cross section of another embodiment of the present invention as applied to rocket motor nozzles;

FIG. 6 is a longitudinal cross section of a diagrammatic view of the present invention having a fully jacketed nozzle;

FIG. 8 is a longitudinal cross section of a rocket nozzle embodying the present invention having a partial jacket construction being metalized and venting the vaporized liquid coolant to the interior of the nozzle; and FIG. 9 is a cross sectional view taken on lines 9—9 of the rocket nozzle shown in FIG. 8.

Before explaining the present invention in detail, it is to be understood that the invention is not limited in its application to the details of construction and arrangement of parts illustrated in the accompanying drawings since the invention is capable of other embodiments and of being carried out in various ways. Also, it is to be understood that the phraseology or terminology employed herein is for the purpose of description and not of limitation.

Figure 1:
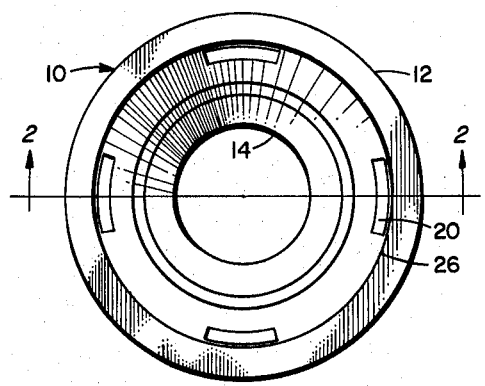
FIG. 1 is a plan view of a rocket motor nozzle embodying the present invention.
Figure 2:
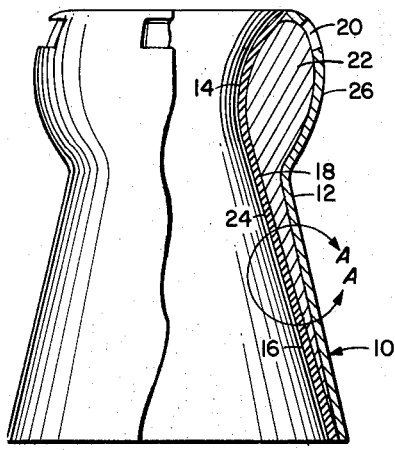
FIG. 2 is a longitudinal cross section taken on line 2—2 of FIG. 1.

Referring to FIGS. 1 and 2 of the attached drawings, a rocket motor nozzle 10 embodying the present invention is composed of an annulus shaped body 12 having a throat 14 and a skirt portion 16. The contour of the exhaust nozzle throat 14 is such that an efficient passage of exhaust gases is obtained in a required direction through the nozzle 10. The body 12 of the nozzle has a cavity 18 therein which extends along both the throat 14 and the skirt portion 16. As shown in both FIGS. 1 and 2, a perforation 20 is shown in the nozzle body 12 adjacent to the throat 14 area, however, the position of this perforation will be later discussed in more detail and its relation to the boiling point of the solid coolant.

The nozzle cavity 18 is filled with a solid coolant material 22 which will melt and vaporize during firing of a rocket motor with the exhaust gases passing through the nozzle. The coolant serves as a heat sink for the energy conducted through the inner wall 24 of the nozzle 10. Metals are the best coolants because of their high heats of vaporization, high boiling film co-efficient, and extremely high limits of nucleate boiling (burnout heat flux). A satisfactory coolant must also have a boiling point of at least several hundred degrees lower than the maximum allowable temperature in the structural materials. Many suitable materials have been investigated analytically and of these lithium, magnesium, sodium, beryllium, aluminum, zinc, and their alloys may be used as the solid coolant. The shape of the cavity 18 is only diagrammatically shown in FIG. 2 but generally is required to have a much larger volume in the area of the throat 14 since this area is subjected to a substantially higher amount of heat during firings contrasted to the substantially lower temperature drop in the exhaust gases in the skirt portion 16 of the nozzle 10.

The purpose of the opening in the outer wall 26 is to permit the coolant to boil and evaporate at temperatures below their normal boiling points, which may be above the propellant gas temperature passing through the nozzle 10. The boiling point of the liquid coolant decreases with a decrease in pressure which in turn decreases with altitude. Thus the coolant temperature may be governed during the nozzle firing in one of two ways: (a) let the coolant boiling temperature drop steadily with decreasing pressure, by providing sufficiently large openings or vents for the vapor to escape to the ambient atmosphere without pressure building up in the nozzle cavity, and (b) control the vapor pressure by regulating the escape of the vapor from the nozzle cavity to the atmosphere at a predetermined rate.

Figure 3:
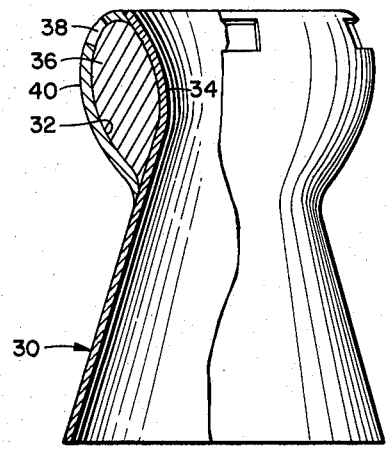
FIG. 3 is a longitudinal cross section of another embodiment of the present invention.

Another embodiment of the present invention is shown in FIG. 3 in which a nozzle 30 has a cavity 32 therein which is centralized in the area of the nozzle throat 34. A solid coolant material 36 is placed within the cavity 32 and an opening or vent 38 is positioned in the outer wall 40 of the nozzle 30. Although FIGS. 2 and 3 illustrate but two illustrations of the shape or position of the solid coolant material in its distribution over the nozzle, it is readily apparent that the coolant material may be distributed in an desired manner in order to regulate the coolant characteristics of the nozzle throat and skirt.

Figure 4:
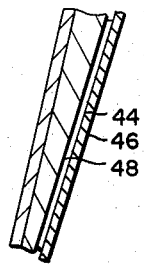
FIG. 4 is an enlarged cross sectional view as shown in the circle A of FIG. 2.

At times it is desirable for the inner nozzle wall to reach its maximum operating temperature in a minimum of time thus reducing the total heat input to the coolant and thereby reducing the coolant quantity. This may be achieved by leaving an air gap 44 between the nozzle inner wall 46 and the solid coolant 48 as shown in FIG. 4. This air gap will disappear when the solid coolant expands and eventually melts. The total heat input may be calculated by $q = hA\Delta Tt$. Where $q$ = the total heat (B.t.u.); $h$ is the convection heat transfer coefficient (from the gases); and $A$ is the internal surface area of the nozzle. $\Delta T$ is the temperature differential between the propellant gas temperature and the internal wall surface temperature, and $t$ is the time of firing duration.

Another embodiment of the present invention is shown in FIG. 5 wherein a nozzle 50 is shown quite similar in configuration and construction to that illustrated in FIG. 2 with the addition of partitions 52, 54 in the area of the nozzle throat 56 and skirt 58. These partitions 52, 54 then separate the solid coolant material 60 contained within the nozzle cavity 62 into separate compartments and each compartment has a vent or opening 64, 66, 68 therein. The effect of this series of compartments thereby limits the amount of solid coolant material 60 which will boil and vaporize at each particular area in the nozzle 50.

Referring now to FIG. 6, another embodiment of the present invention as applied to rockets is illustrated in which a rocket nozzle 70 having a cavity 72 along its entire length quite similar to the nozzle illustrated in FIG. 2. This embodiment differs from the nozzle in FIG. 2 in the addition of a curved partition 74 attached to the outer wall 76 of the nozzle 70. This partition 74 regulates the area of solid coolant material 78 which will be boiled and vaporized and thereby is a structure which will control boiling and vaporizing and in effect control the manner of cooling along the length of the nozzle. In this manner the partition 74 tends to force the solid coolant material 78 to boil along the entire length of the nozzle 70 and thereafter cause the coolant material adjacent the outer wall of the nozzle to melt. It is noted that in this embodiment the opening or vent 80 is positioned adjacent the point of attachment between the outer nozzle wall 76 and the partition 74 as contrasted to the position of the opening or vents in FIGS. 2, 3, and 5. In this manner the boiling and vaporizing can be controlled since the liquid or vaporized coolant material 78 must pass around the entire partition 74 before passing out through the opening or vent 80.

Figure 7:
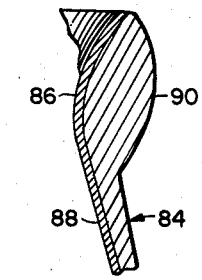
FIG. 7 is a diagrammatic view of a longitudinal cross section of the rocket motor in which the nozzle does not have jackets.

An alternative embodiment is illustrated in FIG. 7 in which the nozzle 84 has a throat 86 and skirt 88 having a solid coolant material 90 attached directly to the nozzle without a chamber to retain the vaporized coolant material. This embodiment is used under conditions in which solid coolants never go through the liquid phase but rather sublime. For instance the melting point of beryllium is 2400° F. and at altitudes below approximately 240,000 feet, the boiling point is above 2400° F. It is therefore conceivable to have a beryllium liner wrapped around the nozzle to sublime above these altitudes and eliminate the outer wall of the nozzle as shown in FIGS. 2–6.

A number of metallic solid coolants have been tested in order to determine the effect of the type of coolant upon the weight of the wall. Lithium has a high heat of vaporization of 8380 B.t.u. per pound at a pressure of 760 mm. of mercury and will result in cooling with a low weight penalty while the use of sodium which has a low melting point at any given altitude will result in a cooler inner nozzle wall. Since wall temperature distributions remain constant once cooling begins, firing duration is limited only to the quantity of coolant which can be carried in the container without introducing prohibitive weight penalties.

It has been found through experimentation that best results will be achieved with structural inner wall materials of high thermal conductivity since these will transmit heat more rapidly to the cooling metal. The temperature gradient across such materials will be less than in low conductivity materials in the same thickness.

The introduction of a thin film or coating of insulating material between the gas stream and the structural wall will result in a reduction of heat transmission, and thus lower structural wall temperature, lower coolant weight requirements and permit operation at lower vapor pressures.

The total thermal resistance is increased, the heat flux is decreased, and the quantity of coolant required is reduced proportionally. This of course will permit either lighter nozzles or longer duration firings. Coatings have been used such as zirconium oxide available from the Norton Abrasive Company under the tradename of Rokide Z. A thin coating of the insulation material in the area of 0.010 inch reduces the heat flux by a factor of two.

Aluminized solid propellants, which are popular in the industry today, have aluminum oxides as one of the combustion products in the hot exhaust gas. Since there is a tendency for aluminum oxide to deposit on the relatively cool nozzle wall, the use of an insulating coating, that raises the surface temperature of the nozzle wall, will serve to permit the control of aluminum oxide deposition thickness by raising its temperature. It should be noted however that the deposition of aluminum oxide or other metallic oxides from the combustion products is advantageous. This deposition protects the nozzle wall from erosion and serves as an insulating coating reducing heat flow and therefore coolant weight. It is conceivable that by careful selection of the wall materials and wall coating insulation that the amount of deposition can be controlled during the firing.

Referring now to FIG. 8, the present invention is shown as adapted to a movable nozzle 92. The portion of the rocket motor chamber 94 is shown with a pair of pivot pins 96 mounted in the bifurcated fingers 98 formed at the extremity of the arms 100. A pair of supports 102 are perforated and mounted on the pivot pins 96 and are fixedly attached to the nozzle 92 to allow rotational movement of the nozzle 92 in relation to the rocket motor chamber 94. The throat 104 of the nozzle 92 is in abutting relation to the rocket motor chamber extension 106 to aid in allowing the pivoting motion of the nozzle 92 without loss of exhaust gases. A flexible diaphragm seal 108 is interposed between the rocket motor chamber extension 106 and nozzle 92 and is retained thereto by a pair of threaded rings 110, 112.

The rocket motor nozzle 92 has solid coolant material 113 contained by the cavity 114 therein in the throat 104 which is separated by a partition 116. The nozzle skirt 118 is formed of edge grain phenolic impregnated refrasil coated by glass fiber rovings impregnated with a plastic such as epoxy resin. A threaded steel skirt attachment 120 joins the outer wall 122 of the nozzle 92 to the skirt 118. The cavity 114 in the throat 104 portion of the nozzle 92 has exhaust passageways 124, 126 therein used to funnel the liquid and vaporized coolant material 113 through passageway 128 and port 130 to the interior of the nozzle. It is noted that in the present embodiment of the invention, the liquid and vaporized solid coolant material 113 is ducted into the nozzle rather than externally from the nozzle as shown in FIGS. 1–6. However, as noted previously, the position of the exhaust port is varied to regulate the boiling point of the solid coolant material. A cooling chamber 132 is inserted in the rocket chamber extension 106. Asbestos packing 134 is placed between rocket chamber 94 and coolant material 136 and the nozzle outer wall 122 and coolant material 113.

Zirconium oxide is coated on the throat portion of the nozzle to a thickness of approximately 0.010 inch.

Several problem areas exist which through careful design can be eliminated. These include sloshing of coolant in the liquid state due to transverse accelerations and swiveling motion of the nozzle as is evident through examination of FIG. 9. Liquid sloshing effects may be minimized by the application of baffles, see FIG. 9, and nozzle wall exposure due to coolant level drop may be minimized by applying a plenum chamber for the coolant. There is no tilt of the liquid coolants surface due to variations of missile attitude since the coolant surface would be perpendicular to the thrust vector regardless of the direction of gravitational field.

Although a specific embodiment of the invention has been shown and described, it will be understood, of course, that it is only illustrative and that various modifications may be made therein without departing from the scope and spirit of this invention as defined in the appended claim.

I claim:

A rocket motor nozzle comprising: an inner wall defining a nozzle throat area and a nozzle skirt area, an outer wall attached to said inner wall and defining an annular jacket therebetween, said annular jacket having an enlarged cavity portion adjacent the throat area defined by said inner wall and said annular jacket gradually diminishing in size in the region adjacent the nozzle skirt area defined by said inner wall, a shaped partition member lying within the enlarged cavity within said jacket and attached to the inner surface of said outer wall at the point of junction between the enlarged cavity portion and the gradually diminishing cavity portion to define within said enlarged cavity portion an inner and an outer annular zone, a perforation in said outer wall extending into the outer annular zone within the enlarged cavity portion of said jacket, a solid metal coolant material located within said cavity portion, whereby on firing of the rocket nozzle the solid metal coolant material within said jacket melts first along the entire outer surface of the said inner wall and is baffled by said partition before being ejected through said perforation.

References Cited by the Examiner

UNITED STATES PATENTS

| | | | |
|---|---|---|---|
| 2,574,190 | 11/1951 | New. | |
| 2,658,332 | 11/1953 | Nicholson | 60—35.6 |
| 3,014,353 | 12/1961 | Scully et al. | 60—35.6 |
| 3,022,190 | 2/1962 | Feldman | 60—35.6 |
| 3,026,806 | 3/1962 | Runton et al. | 102—92.5 |
| 3,048,972 | 8/1962 | Barlow | 60—35.6 |
| 3,069,847 | 12/1962 | Vest | 60—35.6 |
| 3,089,318 | 5/1963 | Hebeler | 60—35.6 |
| 3,103,885 | 9/1963 | McLanchlan | 60—39.66 |
| 3,113,429 | 12/1963 | Davies | 60—35.6 |
| 3,115,746 | 12/1963 | Hsia | 60—35.6 |
| 3,122,883 | 3/1964 | Terner | 60—35.6 |
| 3,129,560 | 4/1964 | Prosen | 60—35.6 |
| 3,137,132 | 6/1964 | Turkat | 60—35.6 |

FOREIGN PATENTS

| | | |
|---|---|---|
| 1,003,758 | 11/1951 | France. |
| 1,108,090 | 8/1955 | France. |
| 1,240,638 | 8/1960 | France. |
| 205,570 | 9/1939 | Switzerland. |

MARK NEWMAN, *Primary Examiner.*

SAMUEL FEINBERG, SAMUEL LEVINE, *Examiners.*
NEWMAN, *Examiners.*

C. R. CROYLE, *Assistant Examiner.*